United States Patent
Lewis (10) Patent No.: US 10,077,667 B2
(45) Date of Patent: Sep. 18, 2018

(54) TURBINE AIRFOIL FILM COOLING HOLES

(71) Applicant: UNITED TECHNOLOGIES CORPORATION, Farmington, CT (US)

(72) Inventor: Scott D. Lewis, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 486 days.

(21) Appl. No.: 14/707,887

(22) Filed: May 8, 2015

(65) Prior Publication Data

US 2016/0326886 A1 Nov. 10, 2016

(51) Int. Cl.
| | |
|---|---|
| F01D 5/18 | (2006.01) |
| F01D 5/14 | (2006.01) |
| F01D 9/04 | (2006.01) |
| F01D 25/12 | (2006.01) |
| F01D 25/30 | (2006.01) |

(52) U.S. Cl.
CPC ............ *F01D 5/187* (2013.01); *F01D 5/147* (2013.01); *F01D 5/186* (2013.01); *F01D 9/041* (2013.01); *F01D 25/12* (2013.01); *F01D 25/30* (2013.01); *F05D 2220/32* (2013.01); *F05D 2230/13* (2013.01); *F05D 2240/12* (2013.01); *F05D 2240/121* (2013.01); *F05D 2240/30* (2013.01); *F05D 2240/303* (2013.01); *F05D 2260/202* (2013.01); *Y02T 50/676* (2013.01)

(58) Field of Classification Search
CPC . F01D 5/18; F01D 5/186; F01D 5/187; F01D 25/12; F05D 2240/121; F05D 2240/303; F05D 2260/202
See application file for complete search history.

(56) References Cited

U.S. PATENT DOCUMENTS

| | | | | |
|---|---|---|---|---|
| 5,307,637 A * | 5/1994 | Stickles | ................. | F23R 3/002 60/756 |
| 5,688,104 A * | 11/1997 | Beabout | ................. | F01D 5/187 415/115 |
| 5,779,437 A * | 7/1998 | Abdel-Messeh | ........ | F01D 5/186 415/115 |
| 6,168,380 B1 * | 1/2001 | Weigand | ................. | F01D 5/187 415/115 |

(Continued)

FOREIGN PATENT DOCUMENTS

| | | |
|---|---|---|
| EP | 2844839 A1 | 3/2015 |
| WO | 2013163150 A1 | 10/2013 |
| WO | 2015035363 A1 | 3/2015 |

OTHER PUBLICATIONS

European Search Report for Application No. EP 16159217.

*Primary Examiner* — Igor Kershteyn
*Assistant Examiner* — Brian P Wolcott
(74) *Attorney, Agent, or Firm* — Cantor Colburn LLP (57) ABSTRACT

A turbomachinery component includes an airfoil section with a cooling passage extending within the airfoil section. A wall is defined between the cooling passage and an exterior surface of the airfoil. At least one row of cooling holes is positioned along a cooling portion of the external wall proximate a leading edge of the airfoil for fluid communication between the cooling passage and the exterior surface of the airfoil. The cooling portion of the airfoil wall is thicker than an average adjacent airfoil wall thickness.

19 Claims, 6 Drawing Sheets

(56) References Cited

U.S. PATENT DOCUMENTS

| | | | |
|---|---|---|---|
| 6,241,469 B1* | 6/2001 | Beeck | B22F 7/004 |
| | | | 415/115 |
| 6,994,521 B2* | 2/2006 | Liang | F01D 5/182 |
| | | | 416/97 R |
| 7,300,252 B2* | 11/2007 | Liang | F01D 5/186 |
| | | | 416/97 R |
| 7,478,994 B2* | 1/2009 | Cunha | F01D 5/18 |
| | | | 415/115 |
| 8,052,390 B1* | 11/2011 | Liang | F01D 5/186 |
| | | | 416/97 R |
| 2005/0265838 A1 | 12/2005 | Liang | |
| 2006/0107668 A1 | 5/2006 | Cunha et al. | |
| 2009/0169394 A1* | 7/2009 | Crow | B23H 9/10 |
| | | | 416/96 R |
| 2010/0119377 A1 | 5/2010 | Tibbott et al. | |
| 2017/0152750 A1* | 6/2017 | Xu | F01D 5/186 |

* cited by examiner

TURBINE AIRFOIL FILM COOLING HOLES

STATEMENT OF GOVERNMENT RIGHTS

This invention was made with government support under contract no. FA8650-09-D-2923-0021 awarded by the United States Air Force. The government has certain rights in the invention.

BACKGROUND OF THE INVENTION

1. Field of the Invention

The present invention relates generally to turbine airfoils, and more specifically to showerhead cooling hole arrangements for turbine airfoils.

2. Description of Related Art

A gas turbine engine includes a turbine section with a plurality of stages of stationary vanes and rotary blades to extract mechanical energy from a hot gas flow passing through the turbine. The gas turbine engine efficiency can be increased by providing for a higher temperature of the gas flow entering the turbine. The temperature entering the turbine may be limited to the first stage vanes and rotor blades ability to withstand the high temperature.

One method of allowing for higher temperatures than the material properties of the first stage vanes and blades would allow is to provide for cooling air passages through the airfoils. Since the cooling air used to cool the airfoils is generally bled off from the compressor, it is also desirable to use a minimum amount of bleed off air in order to improve the efficiency of the engine.

The hottest part of the airfoils is found on the leading edge. Despite the variety of leading edge region cooling configurations in traditional blades and vanes, further improvement is always desirable in order to allow the use of higher operating temperatures and reduced cooling air flow rates through the airfoils, as well as to minimize manufacturing costs. The present disclosure provides a solution for this need.

SUMMARY OF THE INVENTION

A turbomachinery component includes an airfoil section with a cooling passage extending within the airfoil section. A wall is defined between the cooling passage and an exterior surface of the airfoil. At least one row of cooling holes is positioned along a cooling portion of the wall proximate a leading edge of the airfoil for fluid communication between the cooling passage and the exterior surface of the airfoil. The cooling portion of the airfoil wall is thicker than an average adjacent airfoil wall thickness. The airfoil can be a blade or vane for a turbine or compressor, a turbine exhaust case, or any other suitable type of turbine machine airfoil.

The thickness of the cooling portion of the wall can be at least 50% thicker than the surrounding wall area and can be up to 400% thicker than the surrounding area. Each of the cooling holes can have a length over diameter (L/D) ratio range of 5-20. The adjacent walls can include the suction side and pressure side of the airfoil. The rows of cooling holes can be radially spaced along the cooling portion.

A majority of the cooling holes can have a L/D ratio range of 5-20. The airfoil can include one row, two, three, four, five or any other suitable number of rows of cooling holes. In certain embodiments, the number of cooling holes of a first cooling hole row at a first airfoil radial location can be different from the number of cooling holes of a second cooling hole row at a second air foil radial location.

The airfoil can include a row of gill holes along a suction side of the airfoil relative to the cooling holes. In alternate embodiments, the airfoil can include a row of gill holes along a pressure side of the airfoil relative to the cooling holes.

The cooling hole rows can be positioned at the leading edge of the airfoil. In certain embodiments, the cooling hole rows can include holes with a constant cross-sectional area from an inlet of the cooling passage to an exit of the exterior surface of the airfoil. In other embodiments, the cooling hole rows can include holes with a round metering section and a diffusing section.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 4:
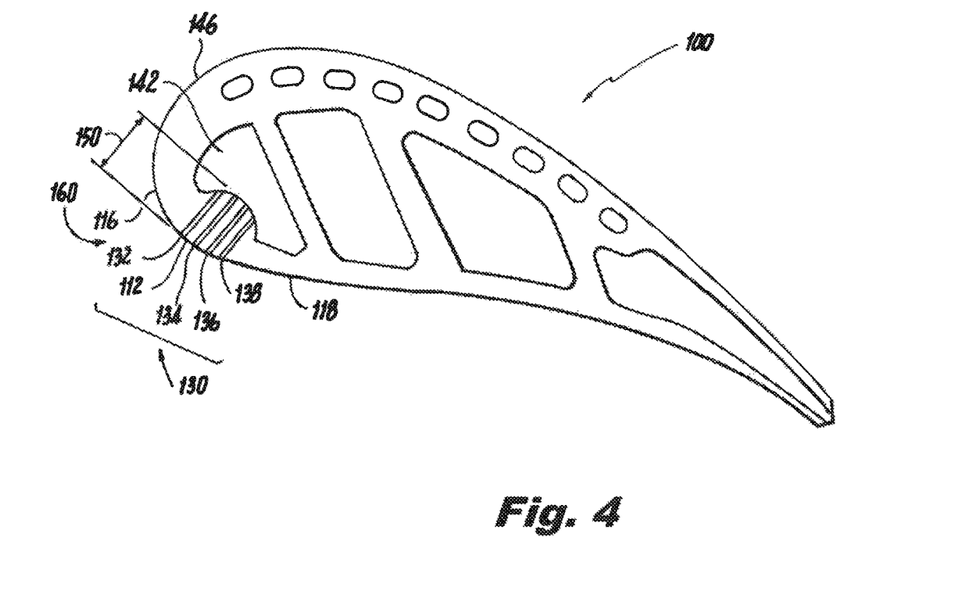
FIG. 4 is a cross sectional top view of an exemplary embodiment of a turbine blade constructed in accordance with the present disclosure, showing four rows of showerhead cooling holes at a leading edge.
Figure 5:
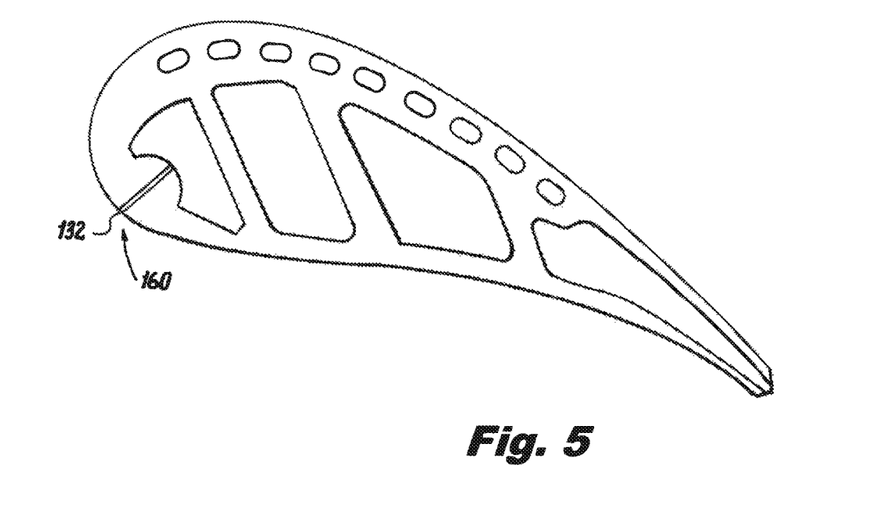
FIG. 5 is a cross sectional top view of the turbine blade of the present disclosure, showing one row of cooling holes at the leading edge.

Reference will now be made to the drawings wherein like reference numerals identify similar structural features or aspects of the subject disclosure. For purposes of explanation and illustration, and not limitation, a partial view of an exemplary embodiment of turbomachine airfoil cooling holes in accordance with the disclosure is shown in FIG. 4 and is designated generally by reference character 100. Other embodiments of the cooling holes in accordance with the disclosure, or aspects thereof, are provided in FIGS. 5-12. The arrangement of cooling holes of the present disclosure increases the leading edge effectiveness and improves the overall convection capability which reduces the airfoil leading edge metal temperature.

Figure 1:
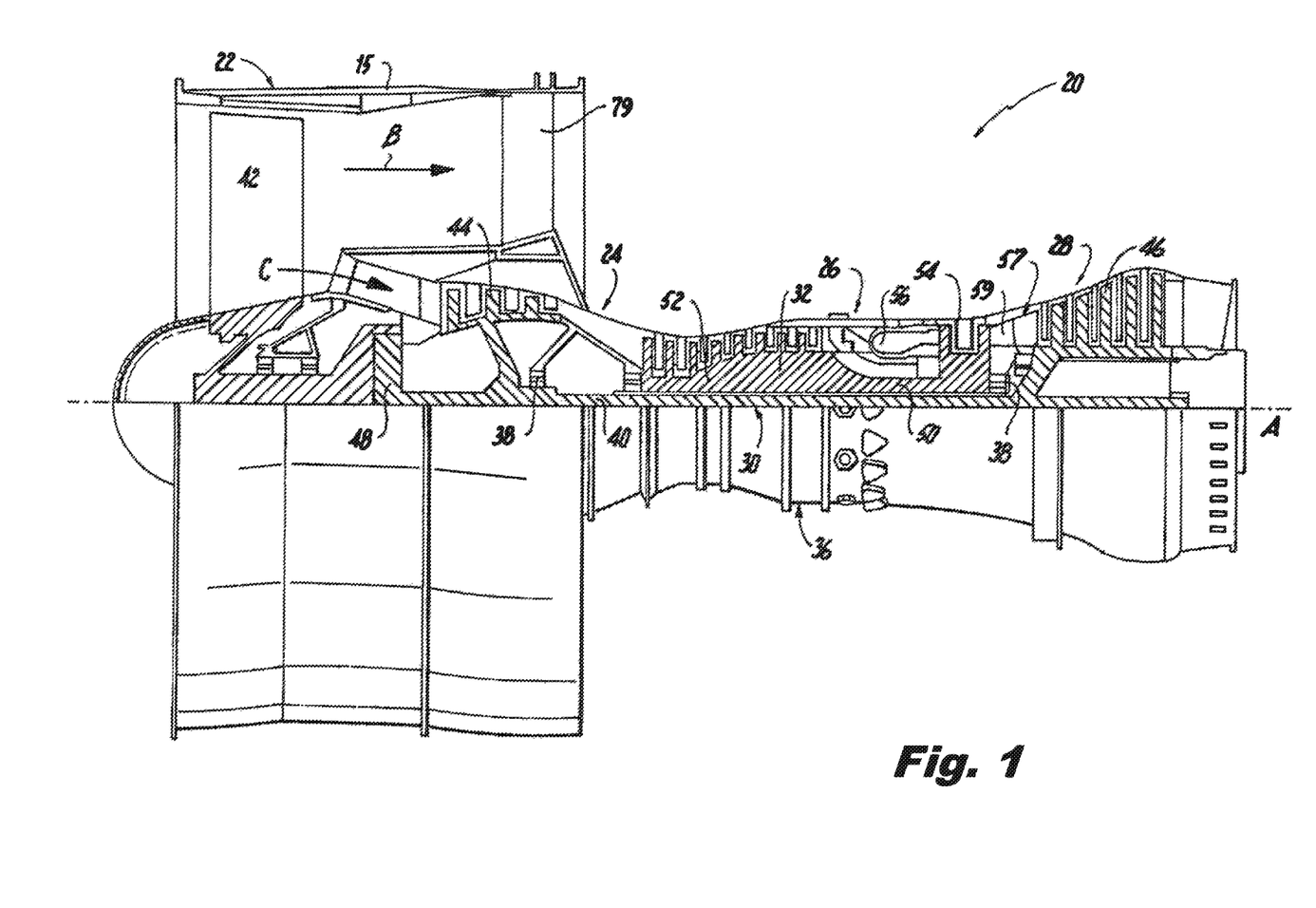
FIG. 1 is a schematic view of a turbomachine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a gear system 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane 79 ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
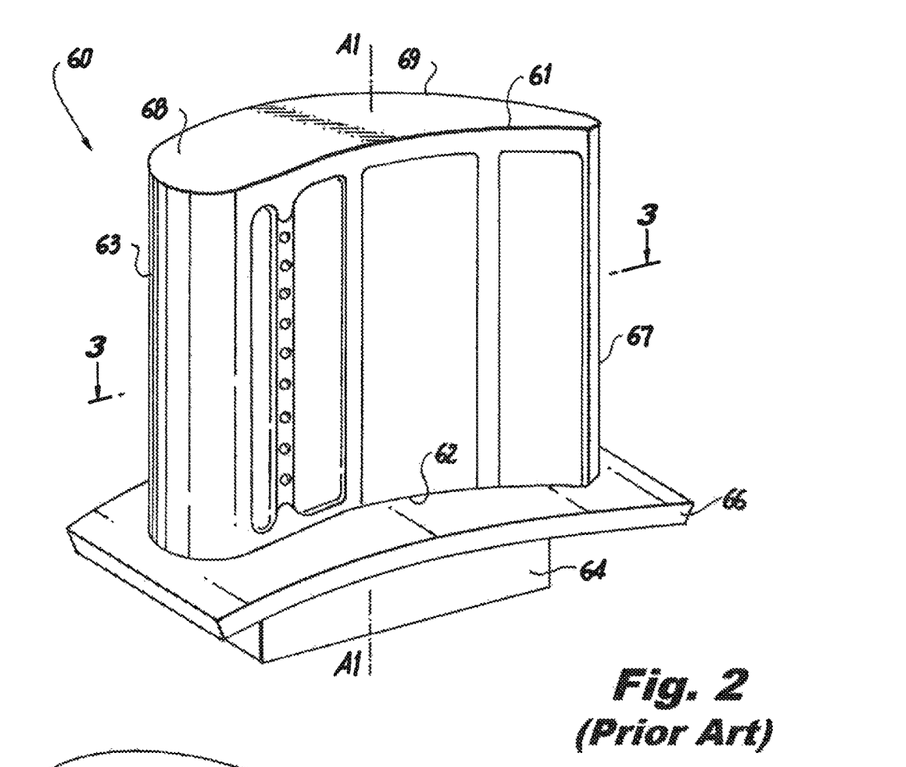
FIG. 2 is a perspective view of an example of a turbine blade known in the art.

FIG. 2 illustrates a typical turbine blade 60 for a gas turbine engine 20, known in the art. The blade 60 includes an attachment 64 including a platform 66. A blade 60 extends from a root 62 coupled to the platform 66 towards a tip 68. The blade 60 further includes a leading edge 63 and a trailing edge 67 on either side of longitudinal axis A1 of the turbine blade 60. A pressure sidewall 61 and a suction sidewall 69 both extend between the leading edge 63 and the trailing edge 67. A cooling passage 70 (shown in FIG. 3) is defined within the blade 60 for supplying cooling air towards the leading edge 63.

Figure 3:
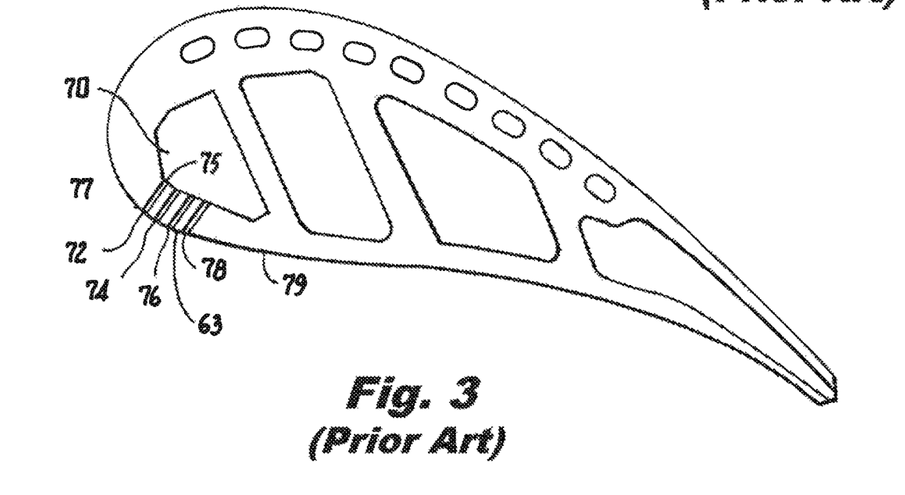
FIG. 3 is a cross sectional top view of a prior art turbine blade.

FIG. 3 illustrates a prior art cross-sectional view of the turbine blade 60. A plurality of cooling rows 72, 74, 76, 78 (shown schematically) are formed at the leading edge 63 from the cooling passage 70 to an external surface 79 of the leading edge. Each film cooling row 72, 74, 76, 78 has an inlet 75 connected to the cooling passage 70 and an outlet 77 opening onto the external surface 79. The cooling air is diffused at outlet 77 forming a film layer of cooling air on the external surface 79 at the leading edge 63. As known in the art, the cooling air is supplied to the cooling passage 70 from the bottom of attachment 64 and, as is typical in many turbine cooling installations, the coolant is supplied by the engine's compressor.

With reference to FIG. 4, a turbine blade 100 in accordance with the present disclosure is shown. The blade 100 includes a plurality of film cooling holes 130 forming an array of cooling rows 132, 134, 136, 138 disposed about leading edge 112. A blade wall 150 is defined between the cooling passage 142 and the exterior surface 146 of the blade 100. A cooling portion 160 is defined between the pressure side 116 and suction side 118 and includes the rows 132, 134, 136, 138 of cooling holes 130. As shown in FIG. 4, the blade wall 150 of the cooling portion 160 has thickness greater than an average of the adjacent wall sections. More specifically, the blade wall 150 thickness is greater than an average thickness of the pressure side 116 and suction side 118. For example, as compared with the prior art blade 60 shown in FIG. 3, a similar region of a blade wall which includes cooling rows 72, 74, 76, and 78 at the leading edge has a uniform thickness with the blade wall at the pressure side and suction side. In contrast, blade wall 150 can be at least 50% thicker than an average of the adjacent wall sections and at most 400% thicker. This increased thickness results is a length over diameter (L/D) ratio of each cooling hole 130 of approximately 5-20. It has been shown that longer cooling holes 130 provide more internal convection on the leading edge 112 of the blade 100. Ultimately this reduces the metal temperature on the leading edge 112 and can be used to reduce the required cooling flow. In the embodiments shown in FIGS. 4-8, the greatest benefit to the longer cooling holes was shown in row 136 although benefits were measured over all cooling holes 130.

FIG. 4 shows a cross-sectional view of one embodiment of the turbine blade with four rows, 132, 134, 136 and 138 of cooling holes 130. The cooling rows 132, 134, 136, 138, and 139 are depicted in FIGS. 4-10 schematically for sake of clarity. The cooling holes 132, 134, 136, 138, and 139 may be conventionally manufactured in the blade casting using suitable electrical discharge machining or laser drilling, for example. FIGS. 5-8 illustrate alternate embodiments with one, two, three, and five rows, respectively. Regardless of the number of rows, each row is radially spaced along the cooling portion 160 of the leading edge 112. Typical designs for cooling rows known in the art, place at least one row of cooling holes along a stagnation point of the blade. However, as the stagnation point may shift based on circulation, particularly in high lift designs, the cooling rows 132, 134, 136, 138 of the present disclosure are not limited by location in relation to the stagnation point.

Figure 6:
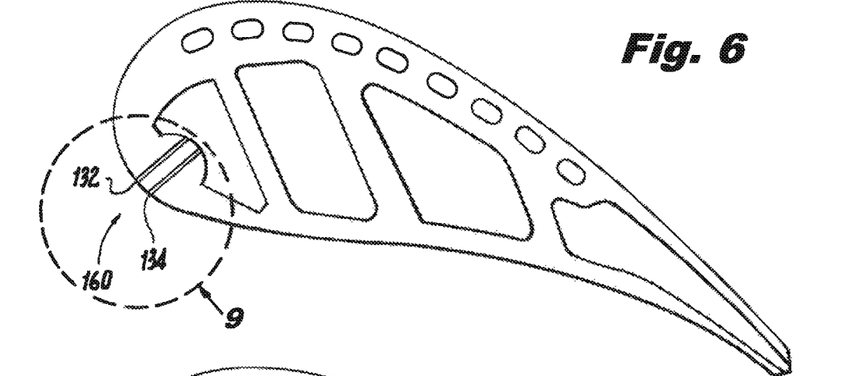
FIG. 6 is a cross sectional top view of the turbine blade of the present disclosure, showing two rows of cooling holes at the leading edge.
Figure 7:
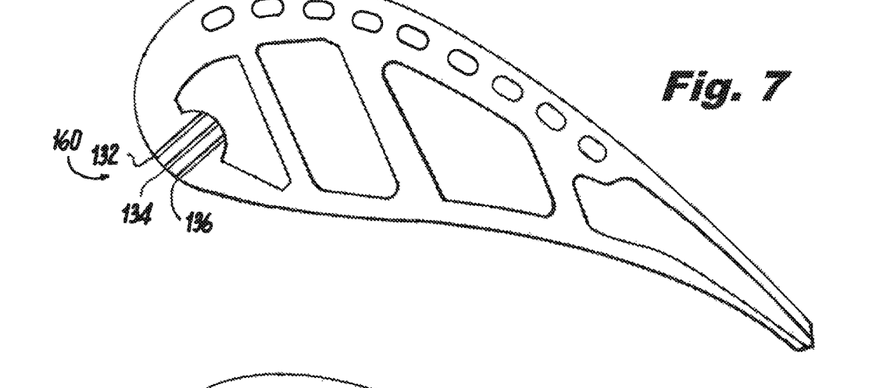
FIG. 7 is a cross sectional top view of the turbine blade of the present disclosure, showing three rows of cooling holes at the leading edge.
Figure 8:
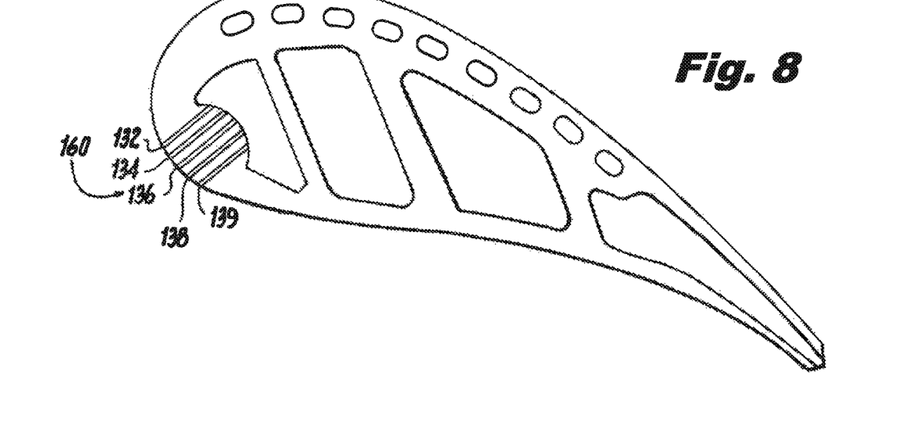
FIG. 8 is a cross sectional top view of the turbine blade of the present disclosure, showing five rows of cooling holes at the leading edge.
Figure 9:
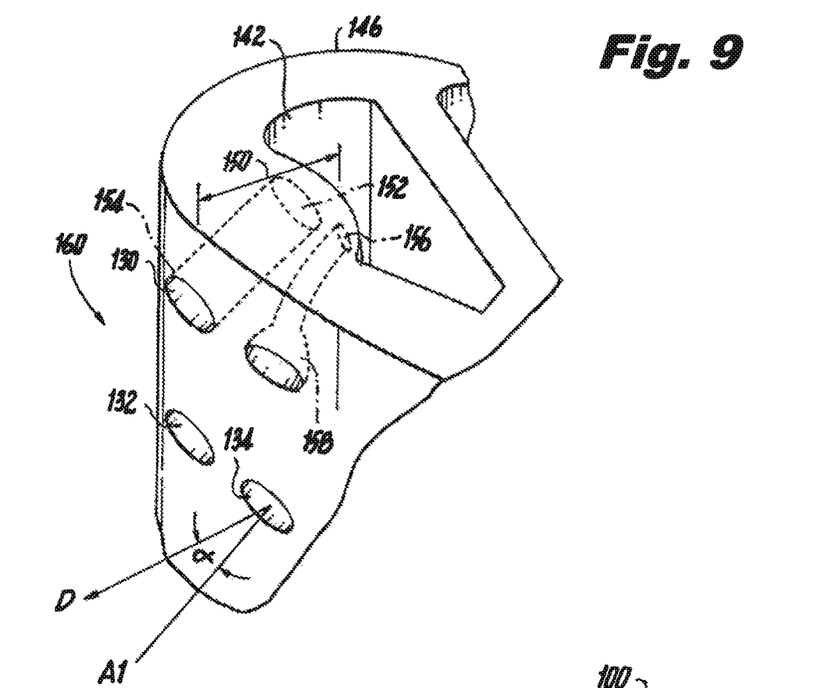
FIG. 9 is a detailed perspective view of FIG. 6, showing a cooling portion of a blade wall thicker than average of adjacent wall thickness.
Figure 10:
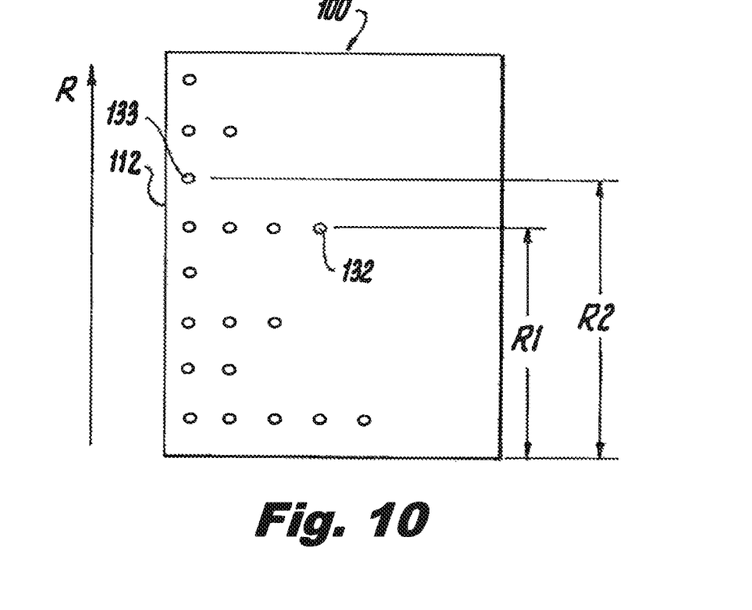
FIG. 10 is a schematic view of an embodiment of the turbine blade of the present disclosure, showing cooling hole rows at one radial location different from cooling hole rows at another radial location.

With reference to FIG. 9, a detailed view of the embodiment of FIG. 6 with two rows of cooling holes is shown. The cooling holes 130 may be substantially cylindrical or conical in shape. The cooling holes 130 may also comprise combinations of cylindrical film cooling holes, diffusive film cooling holes, and film cooling holes of other shapes, geometries, and configurations as known in the art. For example, cooling hole row 132 may include holes 130 with a constant cross-sectional area from an inlet 152 of the cooling passage 142 to an exit 154 of the exterior surface 146 of the blade 100. In alternate embodiments, cooling hole rows 134 include holes 130 with a round metering section 156 and a diffusing section 158. An ejection direction D of the cooling holes is at an angle α with longitudinal axis A1. In certain embodiments, the angle of the cooling holes along each row may be similar, however, in other embodiments, based on the design of the blade, the angles of the cooling holes within each row may vary. FIG. 10 shows schematically embodiments of cooling hole row configurations. As shown in FIG. 10, where the radial location R is indicated, at least one row of cooling hole rows, for example, row 132, at a first radial location R1, may include a different number of cooling holes (i.e. four holes) from a second radial location, e.g., R2, row 133 which includes one cooling hole.

Figure 11:
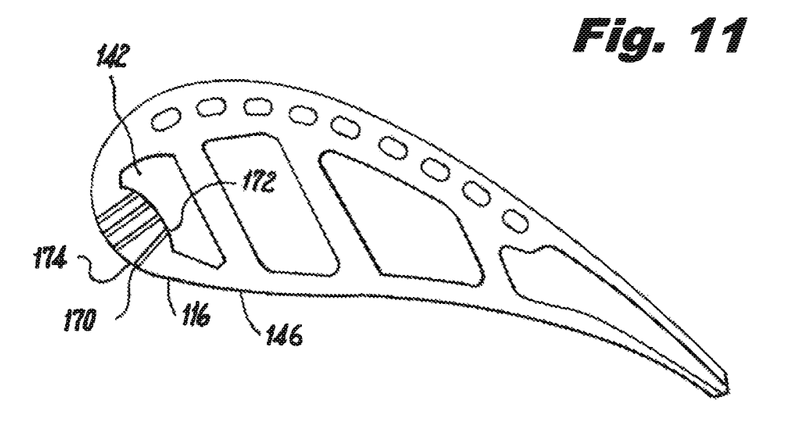
FIG. 11 is a cross sectional top view of another exemplary embodiment the turbine blade constructed in accordance with the present disclosure, showing gill holes along a pressure side of the turbine blade relative to the cooling holes.
Figure 12:
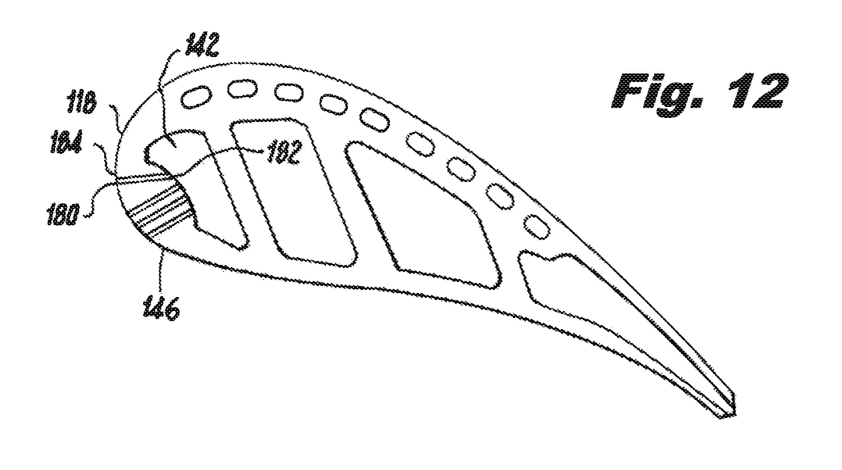
FIG. 12 is a cross sectional top view of another exemplary embodiment the turbine blade constructed in accordance with the present disclosure, showing gill holes along a suction side of the turbine blade relative to the cooling holes.

FIGS. 11 and 12 show additional embodiments of the turbine blade with gill holes on the pressure side and suction side, respectively. Gill holes are typically utilized in specific high temperature areas to provide targeted cooling on these particular areas. A pressure side row of gill holes 170 and a suction side row gill holes 180 are both located downstream from the pressure and suction sides 116, 118, respectively. Cooling air for the cooling holes 130 and gill holes 170, 180 are supplied from the cooling passage 142. The gill holes also have the same structure as the cooling holes 130 with a metering inlet hole 172, 182 followed by an outlet hole 174, 184 at the exterior surface 146.

Those skilled in the art will readily appreciate that the cooling hole configuration described above are discussed in relation to turbine blades but can readily be applied any turbomachinery component including turbine vanes, turbine exhaust cases or any other suitable type of turbo machine airfoil.

The methods and systems of the present disclosure, as described above and shown in the drawings, provide for showerhead cooling holes with superior properties including reducing the metal temperature at the leading edge. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A turbomachinery component, comprising:
   an airfoil section;
   a cooling passage extending within the airfoil section;
   a wall defined between the cooling passage and an exterior surface of the airfoil section; and
   at least one row of cooling holes along a cooling portion of the wall proximate a leading edge of the airfoil section for fluid communication between the cooling passage and the exterior surface of the airfoil section, wherein an internal surface of the wall adjacent to the cooling passage has a convex shape and a thickness of the convex shape is greater than portions of the wall on each side of the convex shape.

2. The turbomachinery component of claim 1, wherein the thickness of the convex shape is at least 50% thicker than an average thickness of the portions of the wall on each side of the convex shape and at most 400% greater than the average thickness of the portions of the wall on each side of the convex shape.

3. The turbomachinery component of claim 1, wherein the portions of the wall on each side of the convex shape include walls of a suction side and a pressure side of the airfoil section.

4. The turbomachinery component of claim 1, wherein a majority of the at least one row of cooling holes have a L/D ratio range of 5-20.

5. The turbomachinery component of claim 1, wherein the at least one row of cooling holes is rows of cooling holes radially spaced along the cooling portion.

6. The turbomachinery component of claim 1, including one row of cooling holes.

7. The turbomachinery component of claim 1, including two rows of cooling holes.

8. The turbomachinery component of claim 1, including three rows of cooling holes.

9. The turbomachinery component of claim 1, including four rows of cooling holes.

10. The turbomachinery component of claim 1, including five rows of cooling holes.

11. The turbomachinery component of claim 1, wherein the number of cooling holes of a first cooling hole row at a first airfoil radial location is different from a number of cooling holes at a second cooling hole row at a second airfoil radial location.

12. The turbomachinery component of claim 1, wherein the at least one row of cooling holes is a plurality of rows and one of the plurality of rows extends radially further than another one of the plurality of rows across the airfoil section.

13. The turbomachinery component of claim 1, further comprising a row of gill holes along a suction side of the airfoil section relative to the at least one row of cooling holes.

14. The turbomachinery component of claim 1, further comprising a row of gill holes along a pressure side of the airfoil section relative to the at least one row of cooling holes.

15. The turbomachinery component of claim 1, wherein the airfoil section is a turbine blade.

16. The turbomachinery component of claim 1, wherein the airfoil section is a turbine vane.

17. The turbomachinery component of claim 1, where the at least one row of cooling holes are positioned at the leading edge of the airfoil section.

18. The turbomachinery component of claim 1, wherein the at least one row of cooling holes include holes with a constant cross-sectional area from an inlet of the cooling passage to an exit of the exterior surface of the airfoil section.

19. The turbomachinery component of claim 1, wherein the at least one row of cooling holes include holes with a round metering section and a diffusing section.

\* \* \* \* \*